US008626335B2

(12) United States Patent
Wurman et al.

(10) Patent No.: US 8,626,335 B2
(45) Date of Patent: Jan. 7, 2014

(54) METHOD AND SYSTEM FOR FULFILLING REQUESTS IN AN INVENTORY SYSTEM

(71) Applicants: Peter R. Wurman, Acton, MA (US); Daniel T. Brunner, Indianapolis, IN (US); Michael T. Barbehenn, Bedford, MA (US)

(72) Inventors: Peter R. Wurman, Acton, MA (US); Daniel T. Brunner, Indianapolis, IN (US); Michael T. Barbehenn, Bedford, MA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/675,450
(22) Filed: Nov. 13, 2012
(65) Prior Publication Data
US 2013/0103185 A1 Apr. 25, 2013

Related U.S. Application Data

(63) Continuation of application No. 12/413,074, filed on Mar. 27, 2009, now abandoned, which is a continuation-in-part of application No. 11/185,198, filed on Jul. 19, 2005, now Pat. No. 7,894,932, and a continuation-in-part of application No. 11/185,467, filed on Jul. 19, 2005, which is a continuation-in-part of application No. 11/185,957, filed on Jul. 19, 2005, now Pat. No. 7,894,933.

(51) Int. Cl.
*G06F 7/00* (2006.01)
(52) U.S. Cl.
USPC .............................. 700/216; 700/214; 235/385
(58) Field of Classification Search
USPC ........................................................ 700/216
See application file for complete search history.

(56) References Cited

U.S. PATENT DOCUMENTS 4,509,123 A 4/1985 Vereen
4,542,808 A 9/1985 Lloyd, Jr. et al.
4,669,047 A 5/1987 Chucta (Continued)

FOREIGN PATENT DOCUMENTS

JP 63-022408 1/1988
JP 02-048303 2/1990

(Continued)

OTHER PUBLICATIONS

A War of Robots, *All Chattering on the Western Front*; Noah Shachtman http://nytimes.com/2002/07/11/technology/circuits/11NEST.html, Jul. 11, 2002.
*Emergence—The Connected Lives of Ants, Brains, Cities, and Software*; Steven Johnsonn; Part Two "Street Level" pp. 73-100; NY, NY, 2001.
*New Rules for the New Economy—10 Radical Strategies for a Connected World*; Kevin Kelly; Chapter 2 "Embrace the Swarm" pp. 1-22; NY,NY, 1998.

(Continued)

*Primary Examiner* — Gene Crawford
*Assistant Examiner* — Kyle Logan
(74) *Attorney, Agent, or Firm* — Baker Botts L.L.P.

(57) ABSTRACT

A method for fulfilling requests in an inventory system includes receiving a request indicating an activity to be completed. The method also includes selecting a holder to fulfill the request and an inventory station at which to fulfill the request. The inventory station is associated with a queue that includes a plurality of queue spaces. The method further includes moving the selected holder from a first location to a second location remote from the selected inventory station. Additionally, the method also includes determining that a trigger event has occurred and, in response to determining that the trigger event has occurred, moving the selected holder from the second location to a queue space of a queue associated with the selected inventory station.

20 Claims, 6 Drawing Sheets

(56) References Cited

U.S. PATENT DOCUMENTS

| | | | |
|---|---|---|---|
| 4,678,390 | A | 7/1987 | Bonneton et al. |
| 4,716,530 | A | 12/1987 | Ogawa et al. |
| 4,780,817 | A | 10/1988 | Lofgren |
| 4,789,940 | A | 12/1988 | Christian |
| 4,996,468 | A | 2/1991 | Field et al. |
| 5,179,329 | A | 1/1993 | Nishikawa et al. |
| 5,187,664 | A | 2/1993 | Yardley et al. |
| 5,228,820 | A | 7/1993 | Stansfield et al. |
| 5,283,739 | A | 2/1994 | Summerville et al. |
| 5,362,197 | A | 11/1994 | Rigling |
| 5,395,199 | A | 3/1995 | Day, III et al. |
| 5,434,490 | A | 7/1995 | Ishida et al. |
| 5,568,030 | A | 10/1996 | Nishikawa et al. |
| 5,646,389 | A | 7/1997 | Bravman et al. |
| 5,652,489 | A | 7/1997 | Kawakami |
| 5,663,879 | A | 9/1997 | Trovato et al. |
| 5,793,934 | A | 8/1998 | Bauer |
| 5,800,777 | A | 9/1998 | Jehan |
| 5,801,506 | A | 9/1998 | Netzler |
| 5,819,008 | A | 10/1998 | Asama et al. |
| 5,825,149 | A | 10/1998 | Matsumoto et al. |
| 5,825,981 | A | 10/1998 | Matsuda |
| 5,928,952 | A | 7/1999 | Hutchins et al. |
| 5,933,394 | A | 8/1999 | Kim |
| 6,049,745 | A | 4/2000 | Douglas et al. |
| 6,061,607 | A | 5/2000 | Bradley et al. |
| 6,148,291 | A | 11/2000 | Radican |
| 6,208,908 | B1 | 3/2001 | Boyd et al. |
| 6,317,648 | B1 | 11/2001 | Sleep et al. |
| 6,339,764 | B1 | 1/2002 | Livesay et al. |
| 6,351,685 | B1 | 2/2002 | Dimitri et al. |
| 6,356,838 | B1 | 3/2002 | Paul |
| 6,411,859 | B1 | 6/2002 | Conboy et al. |
| 6,421,579 | B1 | 7/2002 | Dimitri et al. |
| 6,463,360 | B1 | 10/2002 | Terada et al. |
| 6,463,460 | B1 | 10/2002 | Simonoff |
| 6,549,891 | B1 | 4/2003 | Rauber et al. |
| 6,622,127 | B1 | 9/2003 | Klots et al. |
| 6,748,292 | B2 | 6/2004 | Mountz et al. |
| 6,895,301 | B2 | 5/2005 | Mountz et al. |
| 6,950,722 | B2 | 9/2005 | Mountz et al. |
| 7,894,932 | B2 | 2/2011 | Mountz et al. |
| 7,894,933 | B2 | 2/2011 | Mountz et al. |
| 2002/0026347 | A1 | 2/2002 | Yanagino et al. |
| 2002/0035524 | A1 | 3/2002 | Husslage |
| 2002/0063225 | A1 | 5/2002 | Payton |
| 2002/0188499 | A1 | 12/2002 | Jenkins et al. |
| 2003/0001725 | A1 | 1/2003 | Moore |
| 2003/0110104 | A1 | 6/2003 | King et al. |
| 2004/0002905 | A1 | 1/2004 | Oya |
| 2004/0010337 | A1* | 1/2004 | Mountz .......... 700/214 |
| 2004/0034581 | A1 | 2/2004 | Hill et al. |
| 2005/0102203 | A1 | 5/2005 | Keong |
| 2005/0108114 | A1 | 5/2005 | Kaled |
| 2005/0261975 | A1 | 11/2005 | Carver |
| 2006/0025883 | A1* | 2/2006 | Reeves .......... 700/216 |
| 2006/0036498 | A1 | 2/2006 | Iida et al. |
| 2006/0190276 | A1 | 8/2006 | Williamson |
| 2007/0017984 | A1 | 1/2007 | Mountz et al. |
| 2007/0021863 | A1 | 1/2007 | Mountz et al. |
| 2007/0021864 | A1 | 1/2007 | Mountz et al. |
| 2007/0023193 | A1 | 2/2007 | King |
| 2007/0162360 | A1 | 7/2007 | Congram et al. |
| 2007/0228068 | A1 | 10/2007 | Schneider et al. |
| 2008/0167884 | A1 | 7/2008 | Mountz et al. |

FOREIGN PATENT DOCUMENTS

| | | |
|---|---|---|
| JP | 05-208715 | 8/1993 |
| JP | 2000-272716 | 10/2000 |
| JP | 2006-054389 | 2/2003 |
| JP | 2005-053642 | 3/2004 |
| JP | 2004-106945 | 4/2004 |
| JP | 2005-089023 | 4/2005 |
| WO | WO 96/16365 | 11/1995 |

OTHER PUBLICATIONS

*Pheromone Robotics*; David Payton; Presentation give to the Defense Advance Research Project Agency in Nashville, TN; Jul. 17, 2001.

"Progress in Pheromone Robotics", *7th International Conference on Intelligent Autonomous Systems*; D. Payton, R. Estkowski, M. Howard, Mar. 25-27, 2002, Marina del Rey, CA, Mar. 25-27, 2002.

"Autonomy-Oriented Computation in Pheromone Robotics", *Working Notes of the First International Workshop on Autonomy Oriented Computation (AOC-01)*, pp. 69-77, D. Payton M. Daily, B. Hoff, M. Howard, C. Lee, May 28-Jun. 1, 2001, Montreal, Canada.

"Pheromone Robotics", *Autonomous Robots*, vol. 11, No. 3, Kluwer Academic Publishers, Norwell, MA., Nov. 2001, pp. 319-324 Nov. 2001.

Canadian Intellectual Property Office Action dated Feb. 17, 2012 for application No. 2,613,180; 3 pages.

PCT Notification of Transmittal of the International Search Report and the Written Opinion of the International Searching Authority, or the Declaration, mailed Jul. 15, 2010, regarding PCT/US10/24965 filed Feb. 23, 2012.

Office Action; Japan Patent Office; Application No. 2008-522852; 5 pages including English abstract, Jun. 9, 2011.

Office Action; Japan Patent Office; Application No. 2008-070509; 4 pages including English abstract, Jun. 10, 2011.

Office Action; Japan Patent Office; Application No. 2008-070510; 6 pages including English abstract, Jun. 10, 2011.

Japanese Patent Office Action; Patent Application No. 2008-070509; dated Mar. 28, 2012; mailed Apr. 3, 2012; 6 pages including translation.

European Patent Office Action; Patent Application No. 10 195 643.1-1238; dated Mar. 28, 2012; 7 pages.

Japan Patent Office; Office Action re: Japanese Patent Application No. 2008-070510; mailed May 15, 2012; dated May 10, 2012; 10 pages including translation.

Japan Patent Office; Office Action re: Japanese Patent Application No. 2008-522852; mailed May 29, 2012; dated May 21, 2012; 13 pages including translation.

PCT Notification of Transmittal of the International Search Report and the Written Opinion of the International Searching Authority, or the Declaration with attached PCT Written Opinion of the International Searching Authority, International Application No. PCT/US06/27552, 6 pages, Jul. 7, 2008.

European Patent Office Communication enclosing an extended European Search Report which includes the supplementary European Search Report and the European Search Opinion; Application No. 06787457.8-1238/1920396 PCT/US2006027552; 8 pages Apr. 27, 2010.

USPTO Office Action, U.S. Appl. No. 11/185,467, Filing date Jul. 19, 2005, inventors Mountz et al., 17 pages, Electronically Mailed Jun. 26, 2008.

USPTO Office Action, U.S. Appl. No. 11/185,467, Filing date Jul. 19, 2005, inventors Mountz et al., 13 pages Electronically Mailed Dec. 31, 2008.

USPTO Final Office Action, U.S. Appl. No. 11/185,467, Filing date Jul. 19, 2005, inventors Mountz et al., 14 pages Electronically Mailed Jun. 25, 2009.

USPTO Office Action, U.S. Appl. No. 11/185,467, Filing date Jul. 19, 2005, inventors Mountz et al., 14 pages Electronically Mailed Feb. 5, 2010.

Japanese Patent Office, "Articles 29(2) and 36 of Patent Law," reasons for rejecting present application. Office Action in Japanese, 5 pages, Jun. 28, 2013.

Japanese Patent Office, "Articles 29(2) and 36 of Patent Law," reasons for rejecting present application, Office Action, English Translation, 6 pages.

* cited by examiner

METHOD AND SYSTEM FOR FULFILLING REQUESTS IN AN INVENTORY SYSTEM

RELATED APPLICATIONS

This application is a continuation of U.S. patent application Ser. No. 12/413,074, filed Mar. 27, 2009, now abandoned, and entitled "Method And System for Fulfilling Requests In An Inventory System," which is a continuation-in-part of U.S. application Ser. No. 11/185,198, filed Jul. 19, 2005, now U.S. Pat. No. 7,894,932, and entitled "Method and System for Replenishing Inventory Items;" a continuation-in-part of U.S. application Ser. No. 11/185,957, filed Jul. 19, 2005, now U.S. Pat. No. 7,894,933, and entitled "Method and System for Retrieving Inventory Items;" and a continuation-in-part of U.S. application Ser. No. 11/185,467, filed Jul. 19, 2005 and entitled "Method and System for Storing Inventory Holders."

TECHNICAL FIELD OF THE INVENTION

This invention relates in general to inventory systems, and more particularly to a method and system for efficient storage and retrieval of inventory items.

BACKGROUND OF THE INVENTION

Modern inventory systems, such as those in mail-order warehouses, airport luggage systems, and custom-order manufacturing facilities, face significant challenges in responding to requests for inventory items. In inventory systems tasked with responding to large numbers of diverse orders, slow responses to orders may result in an ever-increasing backlog of inventory requests. Furthermore, in inventory systems encompassing substantial amounts of physical space, response times may depend heavily on the location of inventory items and resources to be used in fulfilling a received order. As a result, efficient use of time, space, and system resources can be crucial to successful operation and management of an inventory system.

SUMMARY OF THE INVENTION

In accordance with the present invention, the disadvantages and problems associated inventory storage have been substantially reduced or eliminated. In particular, a mobile inventory system is provided that includes one or more mobile drive units capable of moving components between locations within a physical space associated with the mobile inventory system for purposes of completing tasks relating to inventory items.

In accordance with one embodiment of the present invention, a method for fulfilling requests within an inventory system includes receiving a request indicating an activity to be completed. The method also includes selecting a holder to fulfill the request and an inventory station at which to fulfill the request. The inventory station is associated with a queue that includes a plurality of queue spaces. The method further includes moving the selected holder from a first location to a second location remote from the selected inventory station. Additionally, the method also includes determining that a trigger event has occurred and, in response to determining that the trigger event has occurred, moving the selected holder from the second location to a queue space of a queue associated with the selected inventory station.

In accordance with another embodiment of the present invention, a system for fulfilling requests within an inventory system includes a plurality of holders, a plurality of inventory stations, and a management module. The inventory holders are capable of storing objects. Inventory items may be removed from the inventory holders at the inventory stations, and each inventory station is associated with a queue comprising a plurality of queue spaces. The management module is capable of receiving a request indicating an activity to be completed and selecting a holder to fulfill the request. The management module is also capable of selecting an inventory station at which to fulfill the request and instructing a mobile drive unit to move the selected holder from a first location to a second location remote from the selected inventory station. Additionally, the management module is capable of determining that a trigger event has occurred, and in response to determining that the trigger event has occurred, instructing the mobile drive unit to move the selected holder from the second location to a queue space of a queue associated with the selected inventory station.

Technical advantages of certain embodiments of the present invention include the ability to optimize use of space and system resources in completing tasks and minimizing task-completion times. Further technical advantages of certain embodiments of the present invention include providing a flexible and scalable inventory storage solution that can be easily adapted to accommodate system growth and modification. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
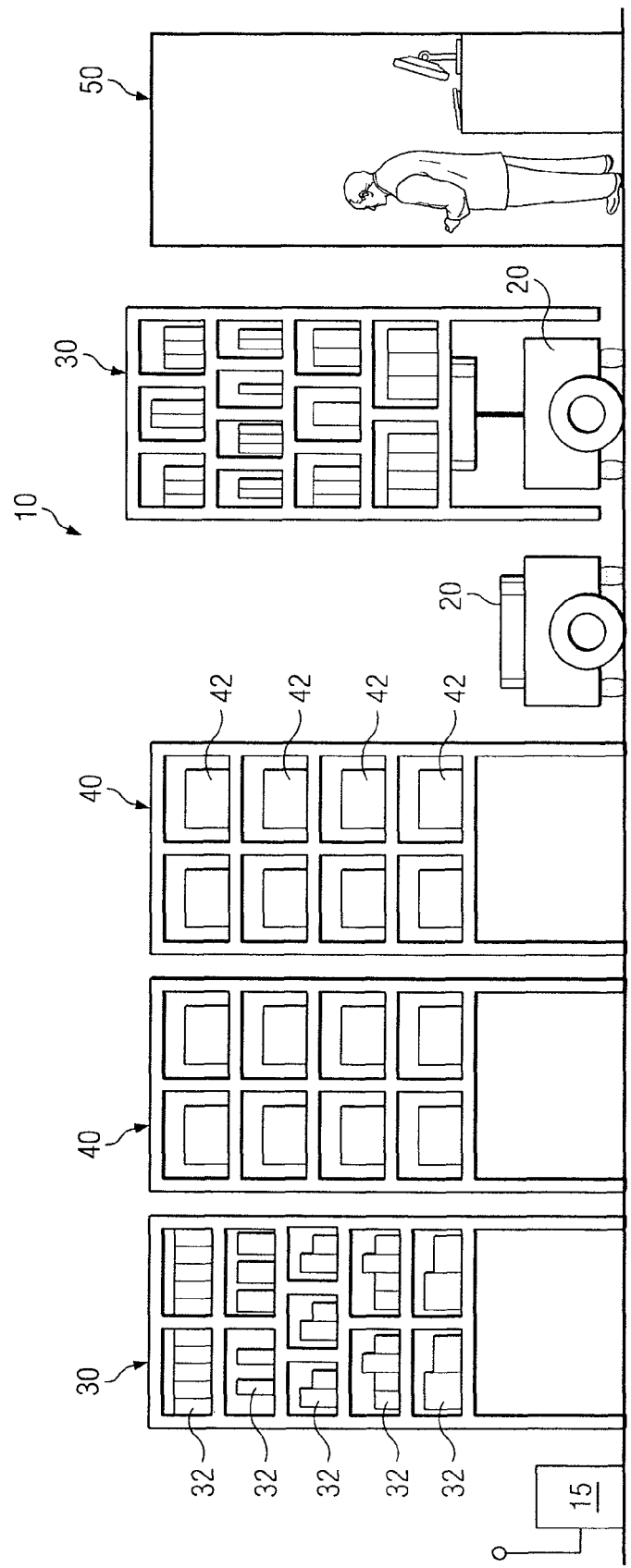
FIG. 1 illustrates components of an inventory system according to a particular embodiment.

FIG. 1 illustrates an inventory system 10 according to a particular embodiment of the present invention. Inventory system 10 includes a management module 15, one or more mobile drive units 20, one or more inventory holders 30, one or more container holders 40, and one or more inventory stations 50. In response to commands communicated by management module 15, mobile drive units 20 transport inventory holders 30 and container holders 40 within a physical area associated with inventory system 10 for purposes of fulfilling orders received by inventory system 10. In particular embodiments, the fulfillment of a particular order may involve the completion of several tasks by inventory system 10 and reducing the time that inventory system 10 spends completing such tasks can improve system throughput. Additionally, in particular embodiments, effective use of the finite physical area available for use by the various components of inventory system 10 can lead to greater system efficiency. As a result, particular embodiments of inventory system 10 may utilize certain techniques to anticipate tasks to be completed by certain components and to position the relevant components so as to reduce the time required to complete the anticipated tasks. Furthermore, certain techniques may be implemented to relieve congestion caused by less sophisticated techniques for positioning these elements. In particular, inventory system 10 may utilize a technique (referred to herein as "drifting") to move components to designated destinations in anticipation of tasks to be completed involving the drifted components.

Management module 15 receives and/or generates requests that initiate particular operations involving mobile drive units 20, inventory holders 30, inventory items 32, container holders 40, containers 42, inventory stations 50, and/or other elements of inventory system 10. Management module 15 may select components of inventory system 10 to perform these operations and communicate commands, instructions, and/or other appropriate information to the selected components to facilitate completion of these operations. Although the description below focuses on embodiments of inventory system 10 that receive requests (such as operation requests 60 illustrated in FIG. 1) from other components of inventory system 10, management module 15 may alternatively or additionally generate such requests itself using any appropriate techniques.

Additionally, management module 15 may represent a single component, multiple components located at a central location within inventory system 10, and/or multiple components distributed throughout inventory system 10. For example, management module 15 may represent components of one or more mobile drive units 20 that are capable of communicating information between the mobile drive units 20 and coordinating movement of mobile drive units 20 in transporting inventory holders 30. In general, management module 15 may include any appropriate combination of hardware and/or software suitable to provide the described functionality and may further include components located on mobile drive units 20, inventory stations 50, or other elements of inventory system 10.

Mobile drive units 20 move inventory holders 30 between locations within a workspace associated with inventory system 10. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about the associated workspace. In alternative embodiments, mobile drive units 20 represent elements of a tracked inventory system 10 configured to move inventory holder 30 along tracks, rails, cables, or other guidance elements traversing the associated workspace. In such an embodiment, mobile drive units 20 may receive power through a connection to the guidance elements, such as a powered rail.

Additionally, mobile drive units 20 may be capable of communicating with management module 15 to receive information identifying selected inventory holders 30, transmit locations of mobile drive units 20, or exchange any other suitable information used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or any other appropriate wireless communication protocol. As another example, in a tracked inventory system 10, tracks or other guidance element upon which mobile drive units 20 move may be wired to facilitate communication between mobile drive units 20 and other components of inventory system 10.

Furthermore, as noted above, management module 15 may include components of individual mobile drive units 20. Thus, for the purposes of this description, communication between management module 15 and a particular mobile drive unit 20 may represent communication between components of a particular mobile drive unit 20. In general, mobile drive units 20 may be powered, controlled, and propelled in any manner appropriate based on the configuration and characteristics of inventory system 10.

Inventory holders 30 store inventory items 32. In a particular embodiment, inventory holders 30 include multiple storage bins with each storage bin capable of holding a different type of inventory item 32. Inventory holders 30 are capable of being carried, rolled, or otherwise moved by mobile drive units 20. In particular embodiments, inventory holder 30 may provide additional propulsion to supplement that provided by mobile drive unit 20 when moving inventory holder 30. Additionally, in particular embodiments, each inventory holder 30 may have a plurality of faces, and each bin may be accessible only through specific faces of the relevant inventory holder 30. Mobile drive units 20 may be configured to rotate inventory holders 30 at appropriate times to present particular faces of inventory holders 30 and the associated bins to an operator or other components of inventory system 10.

Inventory items 32 represent any objects suitable for storage, retrieval, and/or processing in an automated inventory system 10. For the purposes of this description, "inventory items" may represent any one or more objects of a particular type that are stored in inventory system 10. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer. Moreover, in particular embodiments of inventory system 10, boxes containing completed orders may themselves represent inventory items.

As another example, inventory system 10 may represent a merchandise-return facility. In such an embodiment, inventory items may represent merchandise returned by customers. Units of these inventory items may be stored in inventory holders 30 when received at the facility. At appropriate times, a large number of units may be removed from a particular inventory holder 30 and packed for shipment back to a warehouse or other facility.

As yet another example, inventory system 10 may represent a manufacturing facility with inventory items 32 representing individual components of a manufacturing kit to be included in an assembled product, such as electronic components for a customized computer system. In such an embodiment, inventory system 10 may retrieve particular components identified by a specification associated with an order for the product so that a customized version of the product can be built. Although a number of example embodiments are described, inventory system 10 may, in general, represent any suitable facility or system for storing and processing inventory items. Similarly, inventory items 32 may represent objects of any type suitable for storage, retrieval, and/or processing in a particular inventory system 10.

In particular embodiments, inventory system 10 may also include container holders 40 that hold containers 42 in which inventory items 32 may be grouped for various tasks completed in such embodiments of inventory system 10. In a given embodiment, container holders 40 may have any appropriate structure and be configured to store containers 42 in any suitable manner based on the type of containers 42 utilized in inventory system 10 or any other appropriate factors. For example, in particular embodiments, container holders 40 include one or more platform or shelves on which containers 42 rest. As another example, in particular embodiments, container holders 40 include a plurality of bins each holding containers 42 of a different size or type.

Additionally, in particular embodiments, container holders 40 may be substantially similar or identical to inventory holders 30. Certain embodiments of inventory system 10 may include general-purpose holders that can be used as both inventory holders 30 and container holders 40. For example, in particular embodiments, inventory system 10 may include a number of holders that may be dynamically designated as an inventory holder 30 or a container holder 40 depending on whether inventory items 32 or containers 42 are stored on the relevant holder at that particular time. Moreover, in particular embodiments, holders may be configured to simultaneously store both inventory items 32 and containers 42 and a particular holder may, at a particular point in time, represent both an inventory holder 30 and a container holder 40.

Containers 42 represent any appropriate form of container into or onto which inventory items 32 can be placed for storage, shipping, or other appropriate purposes. Examples of containers 42 include, but are not limited to, boxes, pallets, bins, cartons, and envelopes. In particular embodiments, containers 42 are independent of the container holders 40 in which containers 42 are stored, and as a result, containers 42 may be removed from container holders 40 for processing or transferred to other container holders 40. As one example, containers 42 may represent boxes in which or pallets on which inventory items 32 associated with a particular order may be stored for delivery, and the relevant container 42 may then be shipped to a customer associated with that order. As another example, containers 42 may represent bins or other containers in which inventory items 32 may be placed for long term storage and then moved to a special location or removed from inventory system 10.

Inventory stations 50 represent locations designated for the removal of inventory items 32 from inventory holders 30, the introduction of inventory items 32 into inventory holders 30, the transfer of inventory items 32 to containers 42, and/or the processing or handling of inventory items 32 in any other suitable manner. Inventory stations 50 may also represent any appropriate components for processing or handling inventory items 32, such as scanners for monitoring the flow of inventory items 32 in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items 32, such as packing or counting inventory items 32, as part of the operation of inventory system 10.

Although "inventory station" as used in the following description refers to locations at which any appropriate processing operation supported by inventory system 10 may be completed, particular embodiments of inventory system 10 may include specialized inventory stations 50 suitable for performing only a single processing task supported by inventory system 10. Moreover, a particular embodiment of inventory system 10 may include inventory stations 50 that are, in general, capable of handling multiple types of operation requests 60 but, at any given time, configured to handle only one particular type of operation requests 60.

Figure 2:
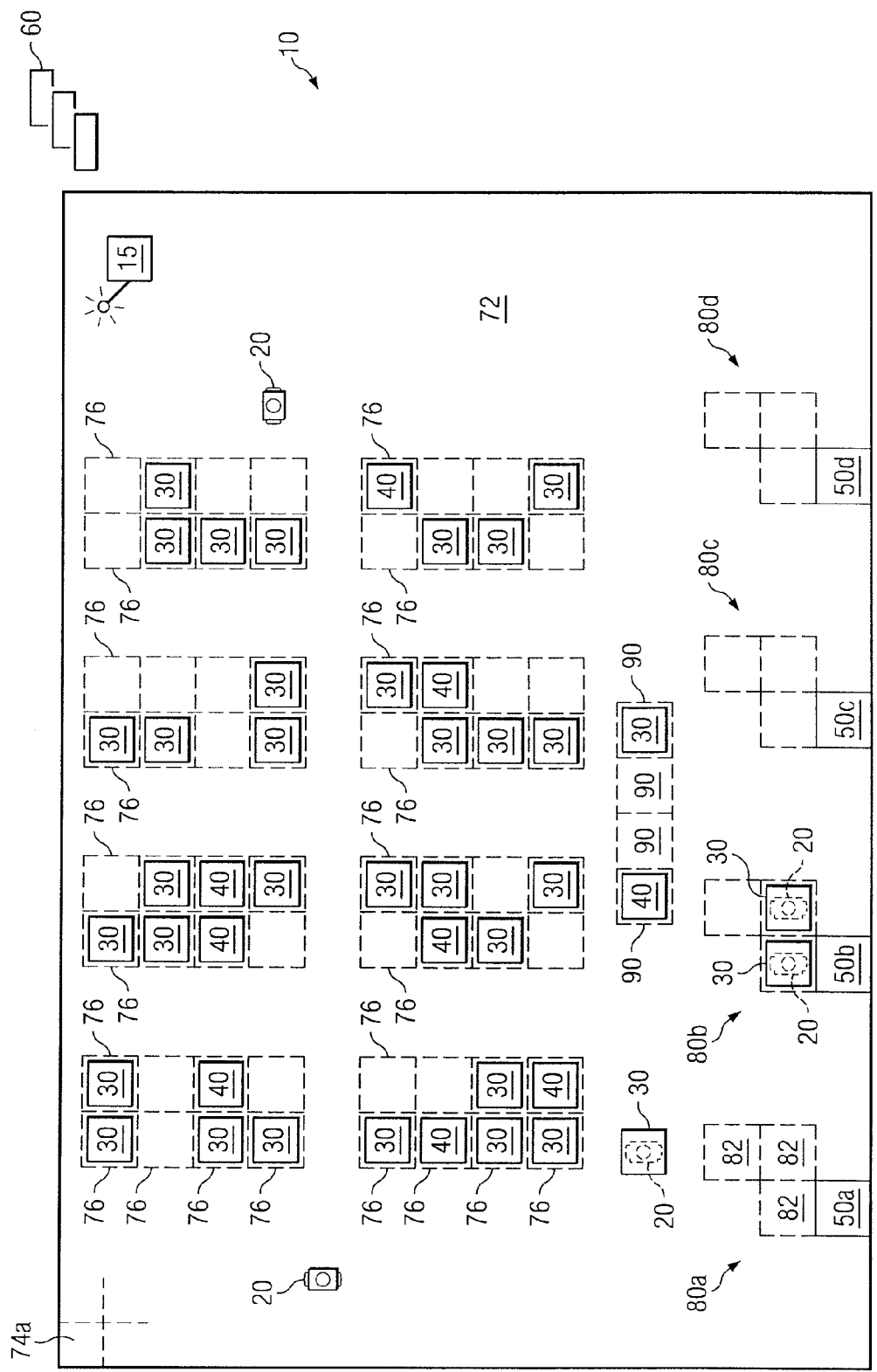
FIG. 2 is an overhead view of a particular embodiment of the inventory system illustrated in FIG. 1.

FIG. 2 is an overhead view of a particular embodiment of inventory system 10 illustrating example operation of the relevant embodiment. In FIG. 2, the elements described above with respect to FIG. 1 are located within a workspace 70. Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or arbitrary geometry.

Additionally, in certain embodiments, workspace 70 may be associated with a grid, tessellation, tiling, or other appropriate division of area to facilitate the use of space resources within inventory system 10 by the various elements of inventory system 10. The illustrated embodiment of FIG. 2 utilizes a grid that divides workspace 70 into a plurality of spaces that are each associated with a particular area of workspace 70 and referred to generically in this description as a "space 74." FIG. 2, for purposes of simplicity, illustrates a single space 74 (shown as "space 74a"), but for purposes of this description it is assumed that a grid divides the entirety of workspace 70 into spaces 74 and other types of spaces, as described further below.

In particular embodiments, various areas within inventory system 10 may be designated for, dedicated to, or otherwise associated with certain activities or uses.

As one example, the embodiment of inventory system 10 in FIG. 2 includes a plurality of storage spaces 76, which represent physical locations where components of inventory system 10 can rest when not being used by inventory system 10 to complete tasks. For example, in particular embodiments, inventory holders 30 and/or container holders 40 may be stored in storage spaces 76 when not being used to fulfill orders. Spaces 74 may be statically designated as storage spaces 76 or may be designated as storage spaces 74 during operation depending on the needs or priorities of inventory system 10.

As another example, the embodiment of inventory system 10 illustrated in FIG. 2 includes a plurality of inventory stations 50 that are each associated with a queue 80 into which components may, under certain circumstances, move or be placed to await processing upon arrival at inventory stations 50. Each queue 80 provides an area for one or more mobile drive units 20, inventory holders 30, container holders 40, and/or other components to rest until the associated inventory station 50 is ready to process a request or perform other tasks associated with the relevant component. In particular embodiments, queues 80 are each associated with a particular physical area of inventory system 10. For example, in the illustrated embodiment, queues 80 are each associated with a plurality of queue spaces 82 in which mobile drive units 20, inventory holders 30, container holders 40, or other components may wait while stored in the corresponding queue 80. In particular embodiments, a particular queue 80 may be statically associated with a fixed group of queue spaces 82. In alternative embodiments, a particular queue 80 may be associated with a dynamically-assigned group of queue spaces 82 determined based on the type of tasks to be completed at the associated inventory station 50, a traffic metric for the associated inventory station 50, and/or any other appropriate factors.

As yet another example, the embodiment of inventory system 10 illustrated in FIG. 1, includes a plurality of drift spaces 90. Drift spaces 90 each represent an area of workspace 70 utilized by inventory system 10 to allow components of inventory system 10, during the completion of a particular task involving that element, to move towards a particular destination or otherwise be positioned so as to reduce a travel time to the relevant destination. In particular embodiments, the relevant element may remain in a particular drift space 90 or a particular group of drift spaces 90 until a trigger event (or events) occurs. After the trigger event occurs, the element may then move toward the relevant system resource for completion of the task. In particular embodiments, spaces 74 may be statically designated as drift spaces 90, while in alternative embodiments, spaces 74 may be dynamically designated as drift spaces 90 depending on the resource needs of inventory system 10, the availability of spaces 74, and/or other appropriate considerations. As described further bellow, drift spaces 90 may be utilized in various ways to improve throughput or otherwise increase system efficiency of certain embodiments of inventory system 10.

When functioning, the various components of inventory system 10 complete certain operations involving inventory items 32 and/or the components of inventory system 10 themselves. Management module 15 manages the operation of components and the use of various system resources to facilitate the fulfillment of these tasks. Although the description below focuses on an embodiment of inventory system 10 capable of performing specific operations, a particular embodiment of inventory system 10 may be configured to perform any appropriate operations associated with the storage, processing, transport, or removal of inventory items 32.

Management module 15 receives operation requests 60 requesting the completion of certain operations associated with inventory items 32. For example, in particular embodiments, management module 15 receives operation requests 60 requesting the packaging and shipment of selected inventory items 32. Additionally, in the illustrated embodiment, management module 15 receives or generates operation requests 60 relating to the maintenance and upkeep of inventory system 10. For example, in particular embodiments, management module 15 receives or generates operation requests 60 related to restocking inventory items 32, recharging mobile drive units 20, delivering empty containers 42 to inventory stations 50, and/or other suitable tasks that allow various components of inventory system 10 to respond to or be utilized in fulfilling orders. Operation requests 60 may represent communication of any form suitable for inventory system 10 and may include any appropriate information identifying inventory items 32, components or resources of inventory system 10, and/or specific operations to be completed.

As noted above, management module 15 may receive operation requests 60 from a human operator or other components of inventory system 10. For example, an operator of inventory system 10 may manually enter operation requests 60 using a keyboard coupled to management module 15. As another example, management module 15 may receive operation requests 60 from remote components over a network connection, such as an Internet connection. Alternatively, management module 15 may itself generate operation requests 60. For example, management module 15 may be configured to initiate a particular operation based on a predetermined schedule or in response to a particular event and may generate operation requests 60 accordingly. In general, management module 15 may receive or generate operation requests 60 in any suitable manner.

In response to receiving or generating an operation request 60, management module 15 may select components or other elements of inventory system 10 to complete the operation request 60. Depending on the type of operation requested, management module 15 may select a particular mobile drive unit 20, inventory holder 30, container holder 40, inventory station 50, and/or other suitable components and elements of inventory system to facilitate completion of the relevant operation request 60. Management module 15 may select the specific components for completing a particular operation request 60 based on any appropriate considerations. As one example, management module 15 may, in particular embodiments, select a particular inventory holder 30 to complete an operation based on factors including, but not limited to, its current distance from one or more mobile drive units 20, the various types of inventory items 32 stored by the selected inventory holder 30, its current location within workspace 70, and/or other operation requests 60 the selected inventory holder 30 is currently being used to fulfill. As another example, management module 15 may, in particular embodiments, select a mobile drive unit 20 to fulfill a particular task based on factors including, but not limited to, its distance from a selected inventory holder 30, a power supply level associated with the selected mobile drive unit 20, and/or its current activity. More generally, however, management module 15 may select suitable components to complete tasks associated with a particular operation request 60 based on any appropriate factors, considerations, or criteria.

After management module 15 selects suitable components and/or elements to complete operation request 60, management module 15 may then communicate information to the selected components indicating tasks to be completed by these components or their operators and/or identifying one or more of the other selected components involved in completion of the requested operation. For example, in the illustrated embodiment, management module 15 communicates task requests 62 to selected components to communicate information regarding tasks to be completed by the receiving components and/or other components to be involved in completing the relevant tasks. Task requests 62 may represent communication of any suitable form to initiate completion of tasks by the receiving components, such as instructions, commands, and/or requests appropriately formatted for the receiving components.

The selected components may then utilize the received information to complete tasks associated with the relevant operation request 60. For example, based on instructions received from management module 15, a selected mobile drive unit 20 may move a selected inventory holder 30 to a selected inventory station 50 so that an operator of the selected inventory station 50 may pick requested inventory items 32 from the selected inventory holder 30 and pack them for shipment. Similarly, an operator of an inventory station 50 may receive information from management module 15 identifying inventory items 32 to be selected from an inventory holder 30 moved to the relevant inventory station 50 and packed in a container 42 as part of fulfilling an operation request 60 received by management module 15.

Because, in particular embodiments, the operation of inventory system 10 is constrained by limits on space, system components, and/or other resources, the efficient use of such resources may increase the throughput and efficiency of inventory system 10. As a result, in particular embodiments, management module 15 may employ various techniques to progressively move, or "drift," inventory holders 30, container holders 40, or other components of inventory system 10 towards inventory stations 50, other system resources, or other destinations within workspace 70. By moving the relevant component towards its destination in stages, management module 15 may be able to time its arrival in a manner that results in more efficient use of space and system resources.

To facilitate this drifting, certain areas within workspace 70 may be designated as drift spaces 90, where components can wait until an appropriate event has occurred triggering further movement of the component, either to another intermediate location or a final destination. Drift spaces 90 may represent any appropriately sized and shaped area of workspace 70 and may be located at any suitable location within workspace 70. Additionally, as noted above, drift spaces 90 may represent fixed, predetermined locations within workspace 70 or may represent a dynamically allocated areas of workspace 70 that may be selected and designated as appropriate during operation of inventory system 10.

Drift spaces 90 may be used by management module 15 in any appropriate manner in completing the tasks associated with operation requests 60. For example, in particular embodiments, management module 15 may park a component destined for a particular system resource, such as an inventory station 50, in a drift space 90 until certain conditions are satisfied (e.g., the resource becomes available for use by the component or the number of other components waiting in the vicinity of the system resource falls below some maximum threshold). This may allow management module 15 to limit congestion in the vicinity of the system resource but also allow management module 15 to reduce the completion time of the relevant operation by positioning the relevant component closer to the system resource while the component waits for the system resource.

Additionally, the use of drift spaces 90 may allow a system component to be positioned close to multiple different instances of a particular system resource and move to the first instance that becomes available. For example, a component may be moved to a drift space 90 removed from all active inventory stations 50 but in relatively close proximity to these inventory stations 50. The component may then wait in its drift space 90 until an inventory station 50 needs the component or an inventory station 50 becomes available to complete a task involving that component. Because the component is moved to an appropriate drift space 90 prior to an inventory station 50 becoming available or needing the component, the component can be quickly repositioned at any of the inventory stations 50 as soon as appropriate.

Furthermore, in certain embodiments, a particular drift space 90 may be designated exclusively for drifting particular types of components, drifting components associated with a particular trigger event, drifting components for a particular purpose, and/or drifting components destined for a particular location. For example, a first drift space 90 may be designated as a waiting place for inventory holders 30 responding to specific retrieval requests 160, while a second drift space 90 may be designated as a waiting place for container holders 40 waiting for a container request 260 to fulfill. Depending on the configuration of inventory system 10, such exclusive drift spaces 90 may be designated when inventory system 10 begins operation or at any appropriate time during operation.

Alternatively, a particular drift space 90 may be designated for use for any type of drifting, and drift spaces 90 may be used interchangeably by components of inventory system 10. For example, in particular embodiments, a particular drift space 90 may be used, at different times, as a waiting place for both inventory holders 30 and container holders 40 en route to various different locations. Furthermore, in certain embodiments, a type of a particular drift space 90 may be designated dynamically during operation of inventory system 10.

As a result, drift spaces 90 may be used in many different ways to provide improved efficiency and throughput in inventory system 10. Additionally, in particular embodiments, drift spaces 90 may be used flexibly to dynamically optimize the effectiveness of inventory system 10. Consequently, the use of drift spaces 90 may provide numerous benefits in inventory system 10. Specific embodiments, however, may provide some, none, or all of these benefits.

FIGS. 3-6 provide specific examples of how drift spaces 90 may be used in particular embodiments of inventory system 10 in fulfilling particular types of operation requests 60. As explained further below, in particular embodiments, the use of drift spaces 90 may limit congestion, reduce task-completion times, and/or otherwise improve system efficiency or throughput. As a result, certain embodiments of inventory system 10 may provide a number of operational benefits. Specific embodiments may, however, provide some, none, or all of these benefits.

Figure 3:
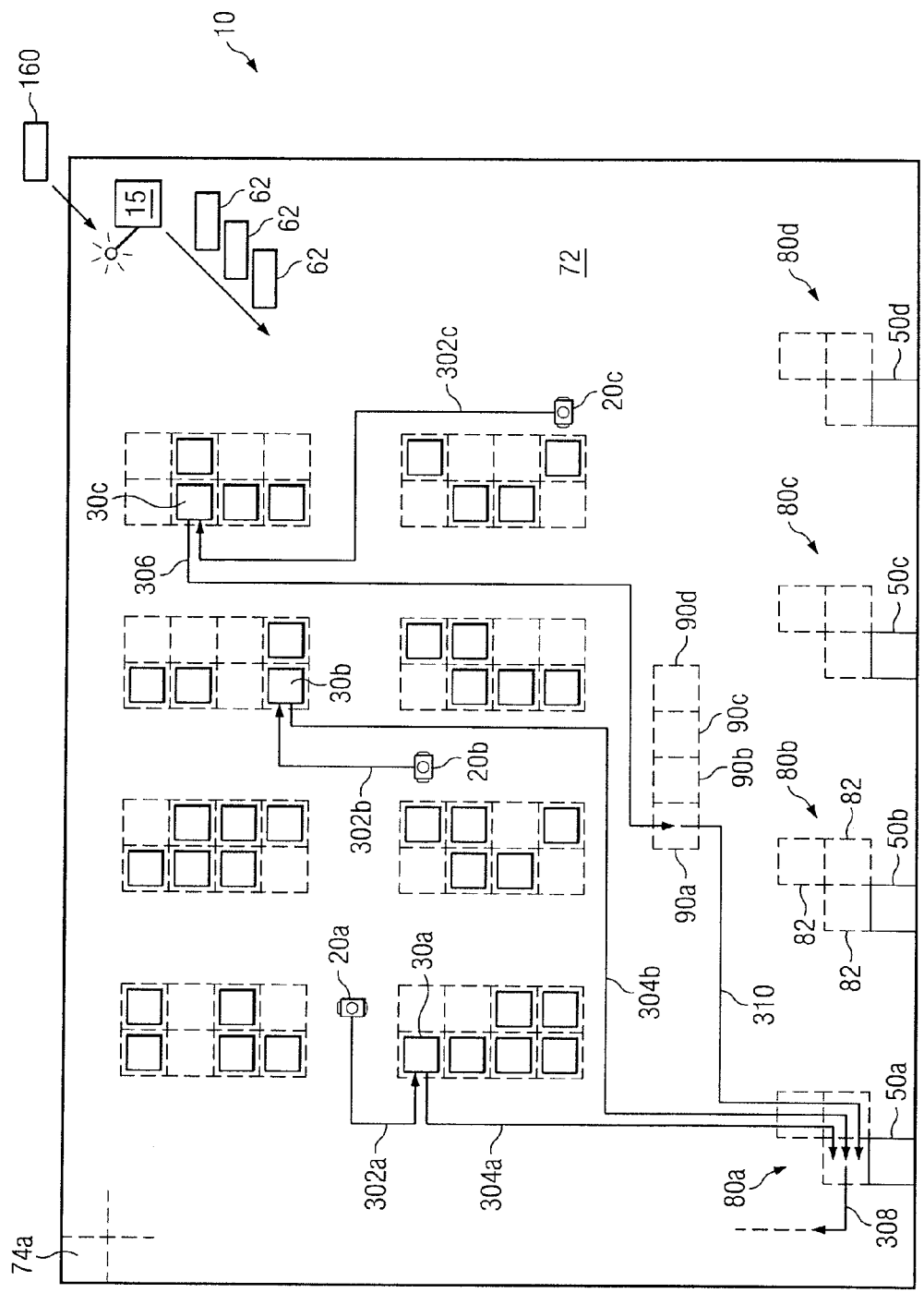
FIG. 3 illustrates example operation of a particular embodiment of the inventory system while completing certain tasks.
Figure 4:
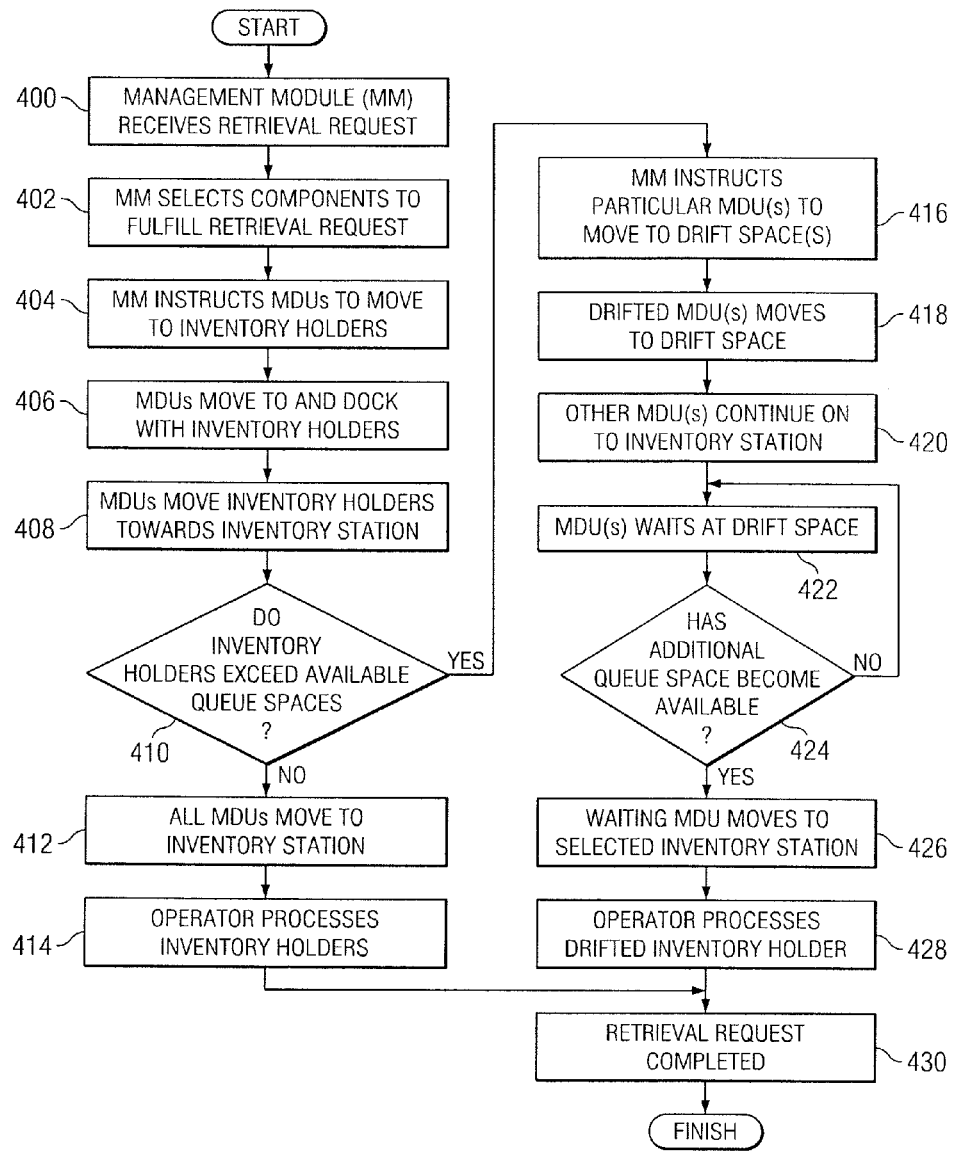
FIG. 4 is a flowchart detailing the steps completed by certain embodiments of the inventory system in executing the example operation illustrated in FIG. 3.

FIGS. 3 and 4 illustrate one example of how drift spaces 90 can be used in particular embodiments of inventory system 10 to improve system efficiency in responding to particular types of operation requests 60. In particular, FIGS. 3 and 4 describe the operation of certain embodiments of inventory system 10 in responding to a particular type of operation request 60 (referred to here as a "retrieval request 160") that identifies one or more inventory items 32 to be retrieved from storage in inventory system 10. In response to receiving retrieval request 160, management module 15 instructs mobile drive units 20 to transport inventory holders 30 storing inventory items 32 requested by retrieval request 160 to a particular inventory station 50 so that the requested inventory items 32 can be collected and prepared for shipping. If several inventory holders 30 are involved in fulfilling retrieval request 160, management module 15 may utilize drift spaces 90 to position one or more of these inventory holders 30 close to the relevant inventory station 50 and then move them to that inventory station 50 as space becomes available nearby. Thus, as explained further below, drift spaces 90 may allow management module 15 to limit the number of inventory holders 30 that are placed in the vicinity of the relevant inventory station 50 while at the same time reducing the lengthy wait time that could result if additional inventory holders 30 had to be retrieved from their original storage spaces 76 when inventory station 50 was ready to process these inventory holders 30.

FIG. 3 illustrates an overhead view of a particular embodiment of inventory system 10 in fulfilling an example retrieval request 160. As noted above, retrieval request 160 is an operation request 60 that identifies one or more types of inventory items 32 to be retrieved from storage in inventory system 10. In particular embodiments, retrieval request 160 may represent a customer order received by inventory system 10 and may identify one or more inventory items 32 to be packaged and shipped to the ordering customer. Inventory items 32 ordered by the customer may be retrieved from inventory holders 30 at an inventory station 50 and packaged for shipping (e.g., in a container 42) or otherwise processed in accordance with the retrieval request 160.

In the illustrated example, management module 15 responds to retrieval request 160 by selecting an inventory station 50, one or more inventory holders 30, and one or more mobile drive units 20 to fulfill retrieval request 160. As noted above, management module 15 may select these components based on any appropriate considerations. FIG. 3 illustrates an example in which management module 15 selects three mobile drive units 20 (shown as mobile drive units 20a, 20b, and 20c) three inventory holders 30 (shown as inventory holders 30a, 30b, and 30c) to fulfill retrieval request 160 at a selected inventory station (shown as inventory station 50a).

After selecting the relevant components, management module 15 may communicate one or more task requests 62 to each of the selected mobile drive units 20 to facilitate transport of the selected inventory holders 30 to the selected inventory station 50. The task requests 62 transmitted to each mobile drive unit 20 identify a selected inventory holder 30 in terms of its location or an identifier associated with the selected inventory holder 30. The selected mobile drive units 20 then move to the selected inventory holders 30 (as shown by arrows 302a-c in FIG. 3) and dock with them. After docking, the selected mobile drive units 20 begin moving the selected inventory holders 30 towards the selected inventory station 50.

Depending on the number of inventory holders 30 selected to fulfill retrieval request 160, the size of a queue associated with the selected inventory station 50, and/or other appropriate considerations, management module 15 may instruct one or more mobile drive units 20 to temporarily move their associated inventory holder 30 to a drift space 90. For example, in the illustrated embodiment, management module 15 is configured to drift one or more inventory holders 30 destined for a particular inventory station 50 when the number of inventory holders 30 en route to that inventory station 50 is greater than two. As a result, in the illustrated example, management module 15 drifts one of the selected inventory holders 30a-c instead of moving the relevant inventory holder 30 directly to inventory station 50a.

Furthermore, if management module 15 decides, in responding to retrieval request 160, to drift one or more inventory holders 30, management module 15 may select the inventory holder 30 or inventory holders 30 to drift based on any suitable criteria or consideration. For example, management module 15 may select inventory holders 30 to drift based on the distance between the drifted inventory holders 30 and the selected inventory station 50, the inventory items 32 stored by the drifted inventory holders 30 (e.g., to allow retrieved inventory items 32 to be packaged in a particular order in a container 42), the time required for the corresponding mobile drive unit 20 to transport the drifted inventory holders 30 to the selected inventory station 50, and/or any other appropriate considerations or criteria.

The mobile drive units 20 associated with inventory holders 30 to be drifted, then move the drifted inventory holders 30 to one of drift spaces 90, while the remaining mobile drive units 20 move their corresponding inventory holders 30 to the selected inventory station 50. In particular embodiments, management module 15 may select a particular drift space 90 for each drifted inventory holder 30. For example, in particular embodiments, management module 15 selects an appropriate drift space 90 for each drifted inventory holder 30 from a list of currently-available drift spaces 90 and communicates a task request 62 identifying the selected drift space 90 and/or its locations to the mobile drive unit 20 docked to the drifted inventory holders 30. Alternatively, in particular embodiments, mobile drive units 20 may themselves determine the drift spaces 90 that are available and select a particular drift space 90 from among the available drift spaces 90. Thus, in the illustrated example, mobile drive units 20a and 20b move their respective inventory holders 30 to inventory station 50a (as shown by arrows 304a and 304b). Additionally, management module 15 selects drift space 90a for inventory holder 30c and instructs mobile drive unit 20c to move inventory holder 30c to drift space 90a. Mobile drive unit 20c then moves to drift space 90a (as shown by arrow 306).

The drifted inventory holders 30 then wait in drift spaces 90 until one or more trigger events occur. These trigger events may represent any suitable events associated with the drifted inventory holders 30, the selected inventory station 50, any other component of inventory station 50, and/or any aspect of the operation of inventory system 10. For example, in particular embodiments, the trigger events may be selected, in part, to limit the number of inventory holders 30 that are moved into the vicinity of the selected inventory station 50 at any given time. Thus, in such embodiments, the trigger events may relate to or involve the expiration of a delay period, an indication from the selected inventory station 50 (or an operator of the selected inventory station 50) that a certain number of the selected inventory holders 30 have been processed, or any other occurrence that indicates or suggests a certain number of the selected inventory holders 30 have been or should have been moved out of the vicinity of the selected inventory station 50.

Furthermore, in particular embodiments, a particular inventory holder 30 may wait in drift spaces 90 until multiple trigger events occur. For example, in certain embodiments, a particular drifted inventory holder 30 may wait in a drift space 90 until one or more other drifted inventory holders 30 move towards their final destinations and some other trigger event occurs. This may allow drifted inventory holders 30 to depart from drift spaces 90 in a particular order, based on a time of arrival, a priority level, and/or other factors. Furthermore, different inventory holders 30 may be associated with different trigger events. Consequently, in particular embodiments, all drifted inventory holders 30 in drift spaces 90 may wait for the same trigger event or events, and their corresponding mobile drive units 20 may move them to their destination when the trigger event or events occur. In other embodiments or under other circumstances, different inventory holders 30 may be associated with different trigger events, with each drifted inventory holder 30 waiting in a drift space 90 until the trigger event associated with that particular drifted inventory holder 30 occurs.

Depending on the configuration and capabilities of management module 15 and mobile drive units 20, management module 15 may notify a mobile drive unit 20 associated with a particular drifted inventory holder 30 that the trigger event associated with that inventory holder 30 has occurred, the mobile drive unit 20 may itself determine that the trigger event has occurred, or both components may be configured to detect some or all of the trigger events occurring in inventory system 10. Additionally, in particular embodiments, the trigger event may represent receipt, by the relevant mobile drive unit 20, of instructions (e.g., task requests 62) from management module 15 or another element of inventory system 10 instructing that mobile drive unit 20 to move an inventory holder 30 from a drift space 90 in which it is waiting to another destination.

Once the trigger event associated with a particular drifted inventory holder 30 has occurred and/or the mobile drive unit 20 transporting that drifted inventory holder 30 has received any appropriate notification of such occurrence, the transporting mobile drive unit 20 moves the relevant inventory holder 30 to its destination. At its destination, the drifted inventory holder 30 is processed in accordance with the retrieval request and inventory items 32 identified by retrieval request 160 are removed from the drifted inventory holder 30. These inventory items 32 may be combined with inventory items 32 selected from other inventory holders 30 to complete fulfillment of retrieval request 160.

In the illustrated example, the trigger event associated with drifted inventory holder 30c is the departure of one or more inventory holders 30 from queue 80a associated with inventory station 50a. As a result, when management module 15 determines that mobile drive unit 20a has exited queue 80a of inventory station 50 (as shown by arrow 308), management module 15 transmits a task request 62 to mobile drive unit 20c, which is waiting in drift space 90a. In response to this task request 62, mobile drive unit 20c moves inventory holder 30c to inventory station 50a (as shown by arrow 310). At inventory station 50a, inventory items 32 identified by retrieval request 160 are then removed from inventory holder 30c to complete the fulfillment of retrieval request 160.

Although FIG. 3 focuses on an example embodiment of inventory system 10 that implements the described techniques in a particular manner, various embodiments may implement the utilized techniques in any appropriate manner. For example, in the described embodiment, a particular mobile drive unit 20 transports each drifted inventory holder 30 or container holder 40 to a drift space 90 and then waits with the drifted holder until the trigger event or events occur. In alternative embodiments, however, mobile drive units 20 may transport drifted inventory holders 30 to drift spaces 90 and leave these drifted inventory holders 30 in drift spaces 90. Other mobile drive units 20 may then be responsible for moving the drifted inventory holders 30 to their final destination once the trigger event or events occur. Moreover, in particular embodiments, a particular mobile drive unit 20 or group of mobile drive units 20 may be used to move all drifted inventory holders 30 between drift spaces 90 and a final destination of the drifted inventory holders 30 and/or between the various drift spaces 90 to manage the use of drift spaces 90.

Additionally, as noted above, drift spaces 90 in workspace 70 may, in particular embodiments, be utilized for more than one purpose or may be associated with more than one destination in workspace 70. Consequently, a particular drift space 90 may, at various different times, be used to drift inventory holders 30 destined for multiple different inventory stations 50. As a result, in fulfilling a subsequent retrieval request 160, the process described above may be repeated with a second mobile drive unit 20 destined for a second inventory station 50 waiting in the same drift space 90 for a particular trigger event to occur. Thus, in particular embodiments, drift spaces 90 may be used to flexibly drift mobile drive units 20 and inventory holders 30 destined for different inventory stations 50.

Furthermore, although the description above describes, for purposes of simplicity, an example in which a final destination is selected for drifted inventory holders 30 before they begin drifting, in alternative embodiments, a final destination for drifted devices may not be chosen until the relevant devices have begun drifting or until after these devices have finished drifting. For example, in particular embodiments, an inventory holder 30 may be selected for fulfilling a received order, but the inventory station 50 at which the received order will be fulfilled may not be determined until later. In such embodiments, the determination may be delayed altogether or a group of candidate inventory stations 50 may be selected when the relevant order is received but a specific inventory station 50 from the candidate group may not be selected until a later time. In such embodiments, management module 15 may select an inventory holder 30 or inventory holders 30 to fulfill the received order but determine that certain necessary or beneficial conditions have not been satisfied and may delay selection of a corresponding inventory station 50.

For example, management module 15 may determine that a container holder 40 on which a particular order will be stored is not yet available. As a result, management module 15 may drift one or more inventory holders 30 associated with the order until the container holder 40 becomes available. Furthermore, to optimize throughput of system 10, management module 15 may wait to choose the inventory station 50 at which the order will ultimately be completed until the relevant container holder 40 is available. As a result, management module 15 may instruct mobile drive units 20 to retrieve the relevant inventory holders 30 and transport those inventory holders 30 to drift spaces 90. When an appropriate triggering event occurs (such as a particular order holder 40 becoming available), management module 15 may select an inventory station 50 at which to fulfill the received order and instruct mobile drive units 20 to move the drifted inventory holders 30 to the relevant inventory station 50. As a result, the use of drift spaces 90 may allow management module 15 to select the optimal inventory station 50 at which to complete the received order based on the state of system 10 when the relevant container holder 40 finally becomes available.

Additionally, in particular embodiments, management module 15 may select a particular inventory holder 30 to fulfill multiple different orders at multiple different inventory stations 50. In such embodiments, management module 15 may use drift spaces 90 to temporarily store the relevant inventory holder 30 before and during completion of the different orders, so that this inventory holder 30 can be positioned close to the relevant inventory stations 50 while its orders are still being completed. Consequently, in such embodiments, management module 15 may drift a particular inventory holder 30 until one (or a particular one) of the inventory stations 50 fulfilling the multiple orders associated with the drifted inventory holder 30 becomes available. After being transported to the available inventory station 50, the inventory holder 30 may then be returned to drift spaces 90 until another inventory station 50 completing an order associated with that inventory holder 30 becomes available.

Thus, in general, drift spaces 90 can be used to move inventory holders 30 or other components of inventory system 10 towards their destination without increasing the congestion in the immediate vicinity of the destination. Limiting the congestion around inventory stations 50 and other system resources can improve efficiency and throughput in certain embodiments of inventory system 10. As a result, particular embodiments of inventory system 10 can provide several operational benefits. Specific embodiments, however, may provide some, all, or none of these benefits.

FIG. 4 is a flowchart illustrating example operation of the embodiment of inventory system 10 shown in FIG. 3. In particular, FIG. 4 illustrates the operation of inventory system 10 in fulfilling a retrieval request 160 received by management module 15. The steps illustrated in FIG. 4 may be combined, modified, or deleted where appropriate, and additional steps may also be added to the flowchart. Additionally, the illustrated steps may be performed in any suitable order.

Operation begins at step 400 in the illustrated example with management module 15 receiving retrieval request 160. As noted above, retrieval request 160 indicates one or more inventory items 32 to be retrieved from inventory system 10. In response to receiving retrieval request 160, management module 15 selects components of inventory system 10 to fulfill retrieval request 160 at step 402. As part of selecting components to fulfill retrieval request 160, management module 15, in the described embodiment, selects one or more inventory holders 30 storing inventory items 32 identified by retrieval request 160, an inventory station 50 at which to fulfill retrieval request 160, and one or more mobile drive units 20 to transport the selected inventory holders 30 to the selected inventory station 50. As discussed above, management module 15 may select these components based on any appropriate criteria or considerations.

At step 404, management module 15 instructs each of the selected mobile drive units 20 to move towards a storage space 76 associated with a particular one of the selected inventory holders 30. In response, the selected mobile drive units 20 each move to the storage space 76 identified to the relevant mobile drive unit 20 and dock with their respective inventory holders 30 at step 406. The selected mobile drive units 20 then begin to move their corresponding inventory holders 30 towards the selected inventory station 50 at step 408.

At any point while fulfilling retrieval request 160, management module 15 may decide, based on any appropriate factors, to drift one or more of the selected inventory holders 30 to limit congestion in the vicinity of the selected inventory station 50, prevent an overflow of the queue 80 associated with the selected inventory station 50, or otherwise improve the efficiency or throughput of inventory system 10. For example, in the illustrated example, management module 15, at step 410, determines whether the number of selected inventory holders 30 exceeds the number of queue spaces 82 available in a queue 80 associated with the selected inventory station 50. The available queue spaces 82 may represent queue spaces 82 in the relevant queue 80 that management module 15 has not already reserved for specific inventory holders 30 destined for the associated inventory station 50, queue spaces 82 not already occupied by inventory holders 30, or queue spaces 82 that are deemed available based on any other suitable criteria. If the number of selected inventory holders 30 does not exceed the number of queue spaces 82 available in the associated queue 80, then operation continues at step 412 with all of the selected mobile drive units 20 continuing on to the selected inventory station 50. At step 414, the selected inventory holders 30 are then processed (e.g., requested inventory items 32 are removed from the selected inventory holders 30) and retrieval request 160 is completed at step 430 as shown in FIG. 4.

If, however, the number of selected inventory holders 30 does exceed the number of queue spaces 82 available in the associated queue 80, then management module 15, according to this example operation, decides to drift one or more inventory holders 30, as shown by steps 416-426 of FIG. 4. Specifically, at step 416, management module 15 instructs a particular mobile drive unit or units 20 to move towards a drift space 90 in workspace 70. At step 418, the relevant mobile drive unit or units 20 move to a drift space 90. Depending on the configuration of inventory system 10, management module 15 may select the drift space 90 to be used or the relevant mobile drive unit 20 may itself choose a particular drift space 90. At step 420, the other mobile drive units 20 transporting inventory holders 30 continue on to the selected inventory station 50 where they are processed.

The drifted mobile drive unit or units 20 then wait, at step 422, for a trigger event to occur. In the illustrated example, the trigger event relates to one or more queue spaces 82 becoming available in a queue 80 associated with the selected inventory station 50. As a result, management module 15 and/or the drifted mobile drive unit or units 20 monitor the availability of queue spaces 82 in the queue 80 associated with the selected inventory station 50 and detect when an additional queue space 82 becomes available. For example, in particular embodiments, management module 15 may maintain a database in which information on the availability of queue spaces 82 (such as information on granted queue space reservations or location data for inventory holders 30 in workspace 70). In such embodiments, management module 15 may determine based on this information when queue spaces 82 become available and may communicate this information to mobile drive units 20 to allow mobile drive units 20 to determine when queue spaces 82 become available. If the appropriate component determines at step 424 that no additional queue spaces 82 have become available, the waiting mobile drive unit or units 20 continue to wait with operation returning to step 422.

If, instead, the appropriate component determines that an additional queue space 82 has become available, the waiting mobile drive unit 20 or one of the waiting mobile drive units 20 moves to the selected inventory station 50 at step 426. When the released mobile drive unit 20 arrives at the selected inventory station 50, the drifted inventory holder 30 may then be processed at step 428. For example, an operator of the selected inventory station 50 may remove inventory items 32 identified by retrieval request 160 from the drifted inventory holder 30 and place them in a container 42 associated with retrieval request 160. If additional inventory holders 30 remain in drift spaces 90, steps 424-428 may be repeated for each as additional queue spaces 82 become available.

Once all the inventory items 32 requested by retrieval request 160 have been picked from the selected inventory holders 30, the packed container 42 may be shipped and/or fulfillment of retrieval request 160 may otherwise be completed as shown at step 430. Operation of inventory system 10 in fulfilling retrieval request 160 may then end as shown in FIG. 4.

Figure 5:
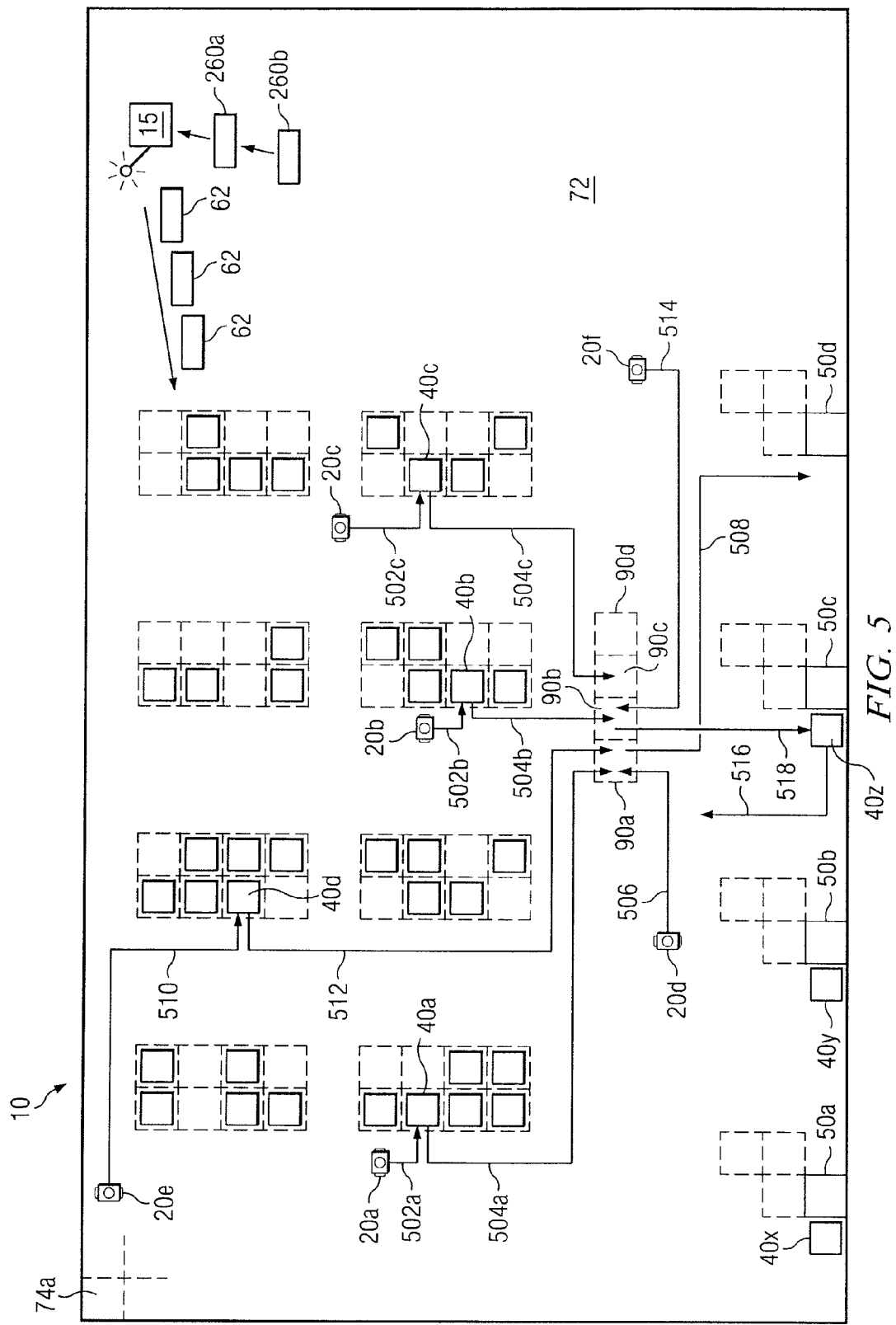
FIG. 5 illustrates example operation of a particular embodiment of the inventory system while completing other tasks.
Figure 6:
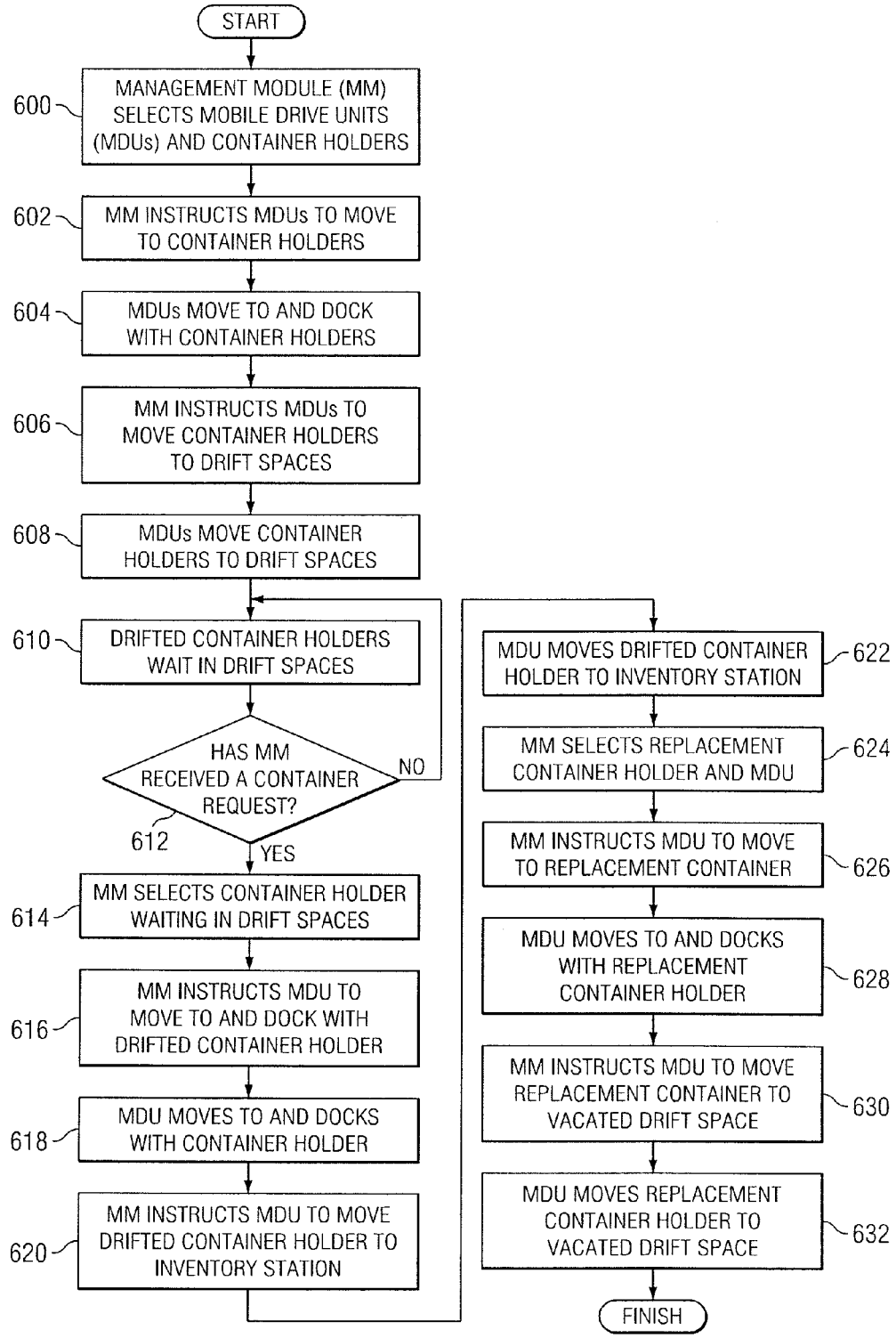
FIG. 6 is a flowchart detailing the steps completed by certain embodiments of the inventory system in executing the example operation illustrated in FIG. 5.

FIGS. 5 and 6 illustrate another example of how drift spaces 90 can be used in particular embodiments of inventory system 10 to improve system efficiency in responding to particular types of operation requests 60. In particular, FIGS. 5 and 6 describe the operation of certain embodiments of inventory system 10 in responding to another type of operation request 60 (referred to here as a "container request 260") that requests delivery of containers 42 to a particular inventory station 50.

More specifically, in particular embodiments of inventory system 10, a container holder 40 may be positioned beside each inventory station 50. As noted above, containers 42 may represent boxes, pallets, or other suitable containers on or in which inventory items 32 may be grouped for storage, shipping, or other purposes. Positioning a container holder 40 next to each inventory station 50 may allow operators of inventory stations 50 to quickly obtain containers 42 when fulfilling retrieval requests 160 or other requests that involve containers 42. Operators can quickly reach into or onto the container holder 40 positioned next to their inventory station 50 whenever a new container 42 is needed. When the supply of containers 42 in the container holder 40 positioned next to an operator's inventory station 50 is exhausted, management module 15 may instruct a mobile drive unit 20 to deliver another container holder 40 having a fresh supply of containers to that operator's inventory station 50. As a result, inventory system 10 can ensure that a steady supply of containers 42 are provided to an inventory station 50 without requiring operators to leave inventory stations 50 to retrieve additional containers 42.

Thus, to reduce the delay experienced between use of the final container 42 in or on the container holder 40 positioned next to a particular inventory station 50 and delivery of another container holder 40 stocked with containers 42 to that inventory station 50, inventory system 10 may utilize drift spaces 90 to locate container holders 40 loaded with containers 42 near to inventory stations 50. When inventory system 10 is operational, one or more container holders 40 may be moved from an initial storage space 74 or other location to drift spaces 90 to wait until needed or requested by a particular inventory station 50. Then, when the supply of containers 42 at a particular inventory station 50 is exhausted, a container holder 40 waiting in a drift space 90 may be moved to the relevant inventory station 50. By positioning stocked container holders 40 in drift spaces 90, certain embodiments of inventory system 10 may reduce the amount of time required to deliver a new container holder 40 to depleted inventory stations 50 and increase the number of retrieval requests 160 and/or other operation requests 60 that each inventory station 50 can process over a given period of time.

FIG. 5, in particular, shows an overhead view of a specific embodiment of inventory system 10 in fulfilling an example container request 260. As noted above, container request 260 is an operation request 60 used in certain embodiments of inventory system 10 to request delivery of containers 42 to a particular inventory station 50. In particular embodiments, container request 260 may represent an instruction, message, or notification sent by the relevant inventory station 50 to management module 15 indicating that the supply of containers 42 at the relevant inventory station 50 has been exhausted and/or requesting additional containers 42 be delivered to the relevant inventory station 50. Management module 15 responds to container requests 260 by instructing a mobile drive unit 20 to transport a container holder 40 to the requesting inventory station 50. To limit the amount of time required to deliver another container holder 40 to inventory station 50, management module 15 may select a container holder 40 waiting in a drift space 90 relatively near to inventory stations 50 to fulfill the container request 260.

More specifically, at an appropriate time during operation of inventory system 10, management module 15 may select one or more container holders 40 to drift until management module 15 receives its next container request 260. For example, in particular embodiments, when inventory system 10 initially starts up, management module 15 may select one or more mobile drive units 20 and one or more container holders 40 and instruct a selected mobile drive unit 20 to move a selected container holder 40 to each active inventory station 50. Management module 15 may also have one or more container holders 40 transported to drift spaces 90. Workspace 70 may be configured so that drift spaces 90 are located relatively close to inventory stations 50 and, in particular embodiments, closer than many or all of storage spaces 76. In the illustrated example, inventory stations 50a-c are initially active, and operation begins with container holders 40 (shown in FIG. 5 as container holders 40x-z) positioned next to each inventory station 50 currently active.

While inventory system 10 is positioning container holders 40 near inventory stations 50 or at an appropriate point in time before or after positioning such container holders 40, inventory system 10 may also move one or more container holders 40 to drift spaces 90. For example, management module 15 may select one or more mobile drive units 20 and one or more container holders 40 and instruct the selected mobile drive units 20 to move the selected container holders 40 to drift spaces 90. In the illustrated example, management module 15 selects mobile drive units 20a-c and container holders 40a-c and instructs mobile drive units 20a-c to move container holders 40a-c to drift spaces 90a-c, respectively (as shown by arrows 502a-c and 504a-c). In particular embodiments, the selected mobile drive units 20 may then undock from the drifted container holders 40 and move away to begin completing other tasks.

Once the selected mobile drive units 20 and container holders 40 are positioned in drift spaces 90, inventory system 10 can begin to respond to container requests 260 using container holders 40 waiting in drift spaces 90. As noted above, container requests 260 request delivery of additional containers 42 to a particular inventory station 50. Depending on the configuration of inventory system 10, container requests 260 may be transmitted by an inventory station 50 (or its operator) when the requesting inventory station 50 becomes active, the supply of containers 42 at the requesting inventory station 50 is exhausted, and/or any other event occurs prompting a need for additional containers at the requesting inventory station 50. In the illustrated example, after mobile drive units 20a-c have moved container holders 40a-c to drift spaces 90a-c, management module 15 receives a first container request 260a from inventory station 50d indicating that inventory station 50d has been activated.

In response to a container request 260, management module 15 may instruct an appropriate mobile drive unit 20 to deliver a container holder 40 from a drift space 90 to the requesting inventory station 50. If more than one container holder 40 are waiting in drift spaces 90, management module 15 selects one of the waiting container holders 40 to fulfill the received container request 260. Management module 15 may select the appropriate container holder 40 based on the length of time the selected contain holder 40 has been waiting in its drift space 90, the number of containers the selected container holder 40 stores, a distance between the requesting inventory station 50 and the drift space 90 in which the selected container holder 40 is waiting, and/or any other suitable considerations or factors. For example, in FIG. 5, management module 15 manages the drifted container holders 40 waiting in drift spaces 90 in a first-in/first-out manner, with the container holder 40 that has been waiting for the longest amount of time being selected to fulfill received container requests 260. As a result, management module 15 selects container holder 40a to fulfill container request 260a.

After selecting a drifted container holder 40 to fulfill a received container request 260, management module 15 may instruct a particular mobile drive unit 20 to transport the drifted container holder 40 to the requesting inventory station 50. For example, in FIG. 5, management module 15 instructs mobile drive unit 20d to move container holder 40a to the requesting inventory station 50, inventory station 50d. The relevant mobile drive unit 20 may then move to and dock with the drifted container holder 40 and transport the drifted container holder 40 to the requesting inventory station 50. Thus, in the illustrated example, mobile drive unit 20d moves to container holder 40a and transports container holder 40a to inventory station 50d to fulfill first container request 260a (as shown by arrows 506 and 508, respectively).

In particular embodiments, management module 15 may replace container holders 40 that are released from drift spaces 90 to fulfill container requests 260. Specifically, management module 15 may select a container holder 40 from a storage space 76, a station where container holders 40 are loaded with containers 42, or any other location in inventory system 10 and dispatch a mobile drive unit 20 to move that container holder 40 to the vacated drift space 90. For example, in FIG. 5, management module 15 instructs mobile drive unit 20e to retrieve container holder 40d and move container holder 40d to the drift space 90 vacated by container holder 40a (as shown by arrows 510 and 512, respectively).

As a result, in particular embodiments, inventory system 10 may maintain a continually-restocked supply of container holders 40 in drift spaces 90 and may be able to fulfill multiple container requests 260 using container holders 40 waiting in drift spaces 90. To illustrate, FIG. 5 also shows management module 15 receiving a second container request 260b from inventory station 50b after fulfilling first container request 260a. Second container request 260b indicates, for example, that inventory station 50c has exhausted the supply of containers 42 stored by container holder 40z initially positioned next to inventory station 50c. In response to second container request 260b, management module 15 selects a container holder 40 (container holder 40b in FIG. 5) and instructs a particular mobile drive unit 20 (mobile drive unit 20f in FIG. 5) to move to and dock with the drifted container holder 40 (as shown by arrow 514). Additionally, management module 15 may also instruct a mobile drive unit 20 (not shown in FIG. 5) docked to the exhausted container holder 40 (container holder 40z in FIG. 5) to move the exhausted container holder 40 away from the requesting inventory station 50 (as shown by arrow 516) so that the transporting mobile drive unit 20 can then position the drifted container holder 40 next to the requesting inventory station 50 (as shown by arrow 518).

Thus, as FIG. 5 illustrates, drift spaces 90 can also be used to drift container holders 40, inventory holders 30, or other components of inventory system 10 when the final destination of the relevant component is not yet determined. This may allow inventory system 10 to position components such as container holders 40 and inventory holders 30 relatively near to several potential destinations prior to a need or use arising for the relevant component at a particular one of the destinations.

FIG. 6 is a flowchart illustrating example operation of the embodiment of inventory system 10 shown in FIG. 5. In particular, FIG. 6 illustrates the operation of inventory system 10 in fulfilling container requests 260 received by management module 15. The steps illustrated in FIG. 6 may be combined, modified, or deleted where appropriate, and additional steps may also be added to the flowchart. Additionally, the illustrated steps may be performed in any suitable order.

Operation begins in the described example with management module 15 positioning one or more container holders 40 in drift spaces 90, as shown by steps 600-608. In particular, management module 15 selects one or more container holders 40 and one or more mobile drive units 20 to transport the selected container holders 40 to drift spaces 90 at step 600. At step 602, management module 15 instructs the selected mobile drive units 20 to move to storage spaces 76 or other locations in which the selected container holders 40 are initially stored. At step 604, the selected mobile drive units 20 then move to and dock with the selected container holders 40.

At step 606, management module 15 instructs the selected mobile drive units 20 to move the selected container holders 40 to drift spaces 90. Each selected mobile drive unit 20 then moves a selected container holder 40 to a drift space 90 at step 608. In particular embodiments, the selected mobile drive units 20 may then undock and move away from the selected container holders 40, leaving the selected container holders 40 in drift spaces 90.

At step 610, the selected mobile drive units 20 subsequently wait in drift spaces 90 for a trigger event to occur. In particular embodiments, the trigger event relates to or is triggered by a need for containers 42 arising at a particular inventory station 50. For example, in the described embodiment, inventory stations 50 transmit container requests 260 to management module 15 to request delivery of containers 42 and/or to indicate their supply of containers 42 is exhausted. As a result, management module 15 determines, at step 612, whether management module 15 has received a container request 260. If not, operation returns to step 610 and the drifted container holders 40 continue to wait in drift spaces 90.

In response to determining it has received a container request 260, management module 15 selects, at step 614, one of the plurality of container holders 40 waiting in drift spaces 90 to fulfill the received container request 260. As noted above, management module 15 may select a container holder 40 to fulfill the received container request 260 based on any appropriate considerations or criteria. In particular embodiments, management module 15 selects the container holder 40 that has been waiting in drift spaces 90 for the longest period of time.

After selecting a particular container holder 40 to fulfill the received container request 260, management module 15 instructs a mobile drive unit 20 to move to and dock with the drifted container holder 40 at step 616 (e.g., by transmitting a task request 62 identifying the relevant drift space 90 and/or its location). In response, the selected mobile drive unit 20 moves to and docks with the drifted container holder 40 at step 618. At step 620, management module 15 instructs the selected mobile drive unit 20 to move the drifted container holder 40 to the requesting inventory station 50. The selected mobile drive unit 20 then moves the drifted container holder 40 from the drift space 90 in which that container holder 40 is waiting to the requesting inventory station 50 at step 622.

In particular embodiments, inventory system 10 may replace the released container holder 40 by moving another container holder 40 into drift spaces 90. This is illustrated in FIG. 6 in steps 624-632. In particular, management module 15 selects a replacement container holder 40 and a mobile drive unit 20 to transport the replacement container holder at step 624. As explained above, management module 15 may select a replacement container holder 40 and a mobile drive unit 20 to transport the replacement container holder 40 based on any appropriate characteristics or considerations. At step 626, management module 15 instructs the selected mobile drive unit 20 to move to the replacement container holder 40. The selected mobile drive unit 20 moves to and docks with the replacement container holder 40 at step 628.

At step 630, management module 15 instructs the selected mobile drive unit 20 to move the replacement container holder 40 to the vacated drift space 90 (or another available drift space 90). At step 632, the selected mobile drive unit 20 moves the replacement container holder 40 to the vacated drift space 90. The replacement container holder 40 may then wait in the relevant drift space 90 until a trigger event associated with the replacement container holder 40 occurs (e.g., receipt of a container request 260 after the replacement container holder 40 has been in its drift space 90 longer than any other drifted container holders 40). Operation of inventory system 10 in responding to the received container request 260 may then end as shown in FIG. 6.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for fulfilling requests in an inventory system, comprising:
   receiving, by a management module, a request to complete an operation associated with an inventory item;
   instructing, by the management module, a mobile drive unit to transport an inventory holder from a storage location to a drift location based at least in part upon the received request, wherein the drift location is an intermediate location that is remote from a queue of an inventory station;
   detecting, by the management module, a trigger event;
   in response to detecting the trigger event, instructing, by the management module, the mobile drive unit to transport the inventory holder from the drift location to the inventory station.

2. The method of claim 1, further comprising:
   identifying a condition associated with the inventory system;
   wherein the mobile drive unit is instructed to transport the inventory holder to the drift location based further at least in part upon the condition.

3. The method of claim 1, further comprising:
   selecting, from a plurality of inventory holders, the inventory holder to fulfill the request; and
   selecting, from a plurality of inventory stations, the inventory station at which to fulfill the request.

4. A method for fulfilling requests in an inventory system, comprising:
   receiving, by a management module, a request to complete an operation associated with an inventory item;
   instructing, by the management module, a mobile drive unit to transport an inventory holder from a storage location to a drift location based at least in part upon the received request;
   detecting, by the management module, a trigger event;
   in response to detecting the trigger event, instructing, by the management module, the mobile drive unit to transport the inventory holder from the drift location to an inventory station;
   wherein the inventory station is one of a plurality of inventory stations, the request is capable of being filled at more than one of the plurality of inventory stations, and detecting the trigger event comprises determining that a space associated with the inventory station is available.

5. The method of claim 1, wherein the drift location comprises an area of a workspace designated as the intermediate location between a starting location and a destination location, at which a component remains until the trigger event associated with the destination location occurs.

6. A method for fulfilling requests in an inventory system, comprising:
   receiving, by a management module, a request to complete an operation associated with an inventory item;
   instructing, by the management module, a mobile drive unit to transport an inventory holder from a storage location to a drift location based at least in part upon the received request;
   detecting, by the management module, a trigger event;
   in response to detecting the trigger event, instructing, by the management module, the mobile drive unit to transport the inventory holder from the drift location to an inventory station;
   wherein the drift location comprises an area of a workspace designated as an intermediate location between a starting location and a destination location, at which a component remains until the trigger event associated with the destination location occurs;
   wherein the drift location is dynamically designated as a drift location based at least in part upon one or more resource requirements of the inventory system.

7. A method for fulfilling requests in an inventory system, comprising:
   receiving, by a management module, a request to complete an operation associated with an inventory item;
   instructing, by the management module, a mobile drive unit to transport an inventory holder from a storage location to a drift location based at least in part upon the received request;
   detecting, by the management module, a trigger event;
   in response to detecting the trigger event, instructing, by the management module, the mobile drive unit to transport the inventory holder from the drift location to an inventory station;
   wherein the drift location is selected from a plurality of locations in a workspace based at least in part upon one or more of a distance between the drift location and the storage location; a distance between the drift location and the inventory station; and a length of a path extending from the storage location to the inventory station through the drift location.

8. The method of claim 1, wherein the drift location comprises a first drift location, the inventory station comprises a first inventory station, and the method further comprises:
   instructing the mobile drive unit to transport the inventory holder from the first inventory station to a second drift location;
   detecting a second trigger event; and
   in response to detecting the second trigger event, instructing the mobile drive unit to transport the inventory holder to a second inventory station.

9. An inventory system, comprising:
   a mobile drive unit operable to transport an inventory holder; and
   a management module operable to:
      receive a request to complete an operation associated with an inventory item;
      instruct the mobile drive unit to transport an inventory holder from a first location to a second location based at least in part upon the received request, wherein the second location is an intermediate location that is remote from a queue of an inventory station;
      detect a trigger event;
      in response to detecting the trigger event, instruct the mobile drive unit to transport the inventory holder from the second location to the inventory station.

10. The inventory system of claim 9, the management module further operable to:
    identify a condition associated with the inventory system;
    instruct the mobile drive unit to transport the inventory holder to the second location based further at least in part upon the condition.

11. The inventory system of claim 9, the management module further operable to:
    select, from a plurality of inventory holders, the inventory holder to fulfill the request; and
    select, from a plurality of inventory stations, the inventory station at which to fulfill the request.

12. An inventory system, comprising:
    a mobile drive unit operable to transport an inventory holder; and a management module operable to:
  receive a request to complete an operation associated with an inventory item;
  instruct the mobile drive unit to transport an inventory holder from a first location to a second location based at least in part upon the received request;
  detect a trigger event;
  in response to detecting the trigger event, instruct the mobile drive unit to transport the inventory holder from the second location to an inventory station;
  wherein the inventory station is one of a plurality of inventory stations, the request is capable of being filled at more than one of the plurality of inventory stations, and detecting the trigger event comprises determining that a space associated with the inventory station is available.

13. The inventory system of claim 9, wherein the second location comprises an area of a workspace designated as the intermediate location between a starting location and a destination location, at which a component remains until the trigger event associated with the destination location occurs.

14. An inventory system, comprising:
  a mobile drive unit operable to transport an inventory holder; and
  a management module operable to:
    receive a request to complete an operation associated with an inventory item;
    instruct the mobile drive unit to transport an inventory holder from a first location to a second location based at least in part upon the received request;
    detect a trigger event;
    in response to detecting the trigger event, instruct the mobile drive unit to transport the inventory holder from the second location to an inventory station;
    wherein the second location comprises a drift location that is selected from a plurality of locations in a workspace based at least in part upon one or more of a distance between the drift location and the first location; a distance between the drift location and the inventory station; and a length of a path extending from the first location to the inventory station through the drift location.

15. A non-transitory computer readable medium comprising logic, the logic, when executed by a processor, operable to:
  receive a request to complete an operation associated with an inventory item;
  instruct the mobile drive unit to transport an inventory holder from a first location to a second location based at least in part upon the received request, wherein the second location is an intermediate location that is remote from a queue of an inventory station;
  detect a trigger event;
  in response to detecting the trigger event, instruct the mobile drive unit to transport the inventory holder from the second location to the inventory station.

16. The computer readable medium of claim 15, the logic further operable to:
  identify a condition associated with an inventory system;
  instruct the mobile drive unit to transport the inventory holder to the second location based further at least in part upon the condition.

17. The computer readable medium of claim 15, the logic further operable to:
  select, from a plurality of inventory holders, the inventory holder to fulfill the request; and
  select, from a plurality of inventory stations, the inventory station at which to fulfill the request.

18. A non-transitory computer readable medium comprising logic, the logic, when executed by a processor, operable to:
  receive a request to complete an operation associated with an inventory item;
  instruct the mobile drive unit to transport an inventory holder from a first location to a second location based at least in part upon the received request;
  detect a trigger event;
  in response to detecting the trigger event, instruct the mobile drive unit to transport the inventory holder from the second location to an inventory station;
  wherein the inventory station is one of a plurality of inventory stations, the request is capable of being filled at more than one of the plurality of inventory stations, and detecting the trigger event comprises determining that a space associated with the inventory station is available.

19. The computer readable medium of claim 15, wherein the second location comprises an area of a workspace designated as the intermediate location between a starting location and a destination location, at which a component remains until the trigger event associated with the destination location occurs.

20. A non-transitory computer readable medium comprising logic, the logic, when executed by a processor, operable to:
  receive a request to complete an operation associated with an inventory item;
  instruct the mobile drive unit to transport an inventory holder from a first location to a second location based at least in part upon the received request;
  detect a trigger event;
  in response to detecting the trigger event, instruct the mobile drive unit to transport the inventory holder from the second location to an inventory station;
  wherein the second location comprises a drift location that is selected from a plurality of locations in a workspace based at least in part upon one or more of a distance between the drift location and the first location; a distance between the drift location and the inventory station; and a length of a path extending from the first location to the inventory station through the drift location.

* * * * *

UNITED STATES PATENT AND TRADEMARK OFFICE
CERTIFICATE OF CORRECTION

PATENT NO. : 8,626,335 B2  
APPLICATION NO. : 13/675450  
DATED : January 7, 2014  
INVENTOR(S) : Peter R. Wurman et al.

Page 1 of 1

It is certified that error appears in the above-identified patent and that said Letters Patent is hereby corrected as shown below:

Title Page, Item (63) Related U.S. Application Data, Line 2:

After "Mar. 27, 2009," delete "now abandoned" and insert --now Pat. No. 8,483,869--.

Signed and Sealed this
Twenty-seventh Day of January, 2015

Michelle K. Lee
*Deputy Director of the United States Patent and Trademark Office*